(12) United States Patent
Kitagawa et al.

(10) Patent No.: US 8,728,629 B2
(45) Date of Patent: *May 20, 2014

(54) TERMINAL FOR CONNECTOR AND METHOD OF PRODUCING THE SAME

(75) Inventors: Shuichi Kitagawa, Tokyo (JP); Kengo Mitose, Tokyo (JP); Yoshiaki Kobayashi, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 226 days.

This patent is subject to a terminal disclaimer.

(21) Appl. No.: 12/885,059

(22) Filed: Sep. 17, 2010

(65) Prior Publication Data

US 2011/0003520 A1    Jan. 6, 2011

Related U.S. Application Data

(63) Continuation of application No. PCT/JP2009/055359, filed on Mar. 18, 2009.

(30) Foreign Application Priority Data

Mar. 19, 2008 (JP) ................................ 2008-072547
Mar. 19, 2008 (JP) ................................ 2008-072548

(51) Int. Cl.
| | |
|---|---|
| C25D 5/50 | (2006.01) |
| C25D 3/12 | (2006.01) |
| C25D 3/30 | (2006.01) |
| H01R 13/03 | (2006.01) |
| B23K 26/00 | (2014.01) |
| C22F 1/08 | (2006.01) |

(52) U.S. Cl.
CPC .. *C25D 3/30* (2013.01); *C25D 3/12* (2013.01); *C25D 5/505* (2013.01); *H01R 13/03* (2013.01); *B23K 26/0081* (2013.01); *C22F 1/08* (2013.01); *Y10S 428/929* (2013.01)

USPC .......... 428/647; 428/648; 428/929; 439/886; 439/887; 29/879; 148/525; 148/537; 219/121.66; 205/226; 205/228; 427/123; 427/383.7

(58) Field of Classification Search
None
See application file for complete search history.

(56) References Cited

U.S. PATENT DOCUMENTS

| | | | |
|---|---|---|---|
| 6,548,898 B2 * | 4/2003 | Matsuki et al. ............... | 257/746 |
| 6,759,142 B2 * | 7/2004 | Hara et al. .................... | 428/647 |

(Continued)

FOREIGN PATENT DOCUMENTS

| | | | |
|---|---|---|---|
| CN | 101138134 A | | 3/2008 |
| EP | 1 281 789 | * | 7/2002 |

(Continued)

OTHER PUBLICATIONS

Machine translation of JP 11-233228. Aug. 1999.*

(Continued)

*Primary Examiner* — John J Zimmerman
(74) *Attorney, Agent, or Firm* — Birch, Stewart, Kolasch & Birch, LLP

(57) ABSTRACT

A connector terminal, fabricated from a metallic material for connector which material has a tin or tin alloy layer, formed on a copper or copper alloy base material, wherein the thickness of the tin or tin alloy layer at a contact site on the surface of the terminal is smaller than the thickness of the tin or tin alloy layer in the areas other than the contact site, and a copper-tin alloy layer is formed as an under layer of the tin or tin alloy layer at the contact site; and a connector terminal, fabricated from a metallic material for connector which material has a copper or copper alloy base material, wherein a copper-tin alloy layer is formed in a spot shape at a contact site on the surface of the terminal, and a tin or tin alloy layer is formed in the remaining areas on the surface.

12 Claims, 1 Drawing Sheet

(a)

(b)

(c)

(56) References Cited

U.S. PATENT DOCUMENTS

| | | | |
|---|---|---|---|
| 7,700,883 B2 * | 4/2010 | Masago et al. | 174/126.2 |
| 2001/0008709 A1 | 7/2001 | Asakura et al. | |
| 2003/0091855 A1 * | 5/2003 | Tanaka et al. | 428/647 |
| 2003/0186597 A1 * | 10/2003 | Suzuki et al. | 439/886 |
| 2004/0229077 A1 | 11/2004 | Mori et al. | |
| 2005/0037229 A1 | 2/2005 | Tanaka | |
| 2005/0048308 A1 | 3/2005 | Mucklich et al. | |
| 2008/0188100 A1 | 8/2008 | Saitoh | |
| 2008/0257581 A1 | 10/2008 | Masago et al. | |
| 2010/0190390 A1 * | 7/2010 | Yoshida et al. | 439/886 |
| 2011/0003167 A1 * | 1/2011 | Kitagawa et al. | 428/600 |

FOREIGN PATENT DOCUMENTS

| | | |
|---|---|---|
| EP | 1788585 A1 | 5/2007 |
| JP | 10-134869 A | 5/1998 |
| JP | 11-233228 A | 8/1999 |
| JP | 2000-21545 A | 1/2000 |
| JP | 2000-21546 A | 1/2000 |
| JP | 2003-171790 A | 6/2003 |
| JP | 2005-154819 * | 6/2005 |
| JP | 2005-353352 A | 12/2005 |
| JP | 2006-161127 A | 6/2006 |
| JP | 2006-172877 A | 6/2006 |
| JP | 2006-196323 A | 7/2006 |
| JP | 2007-258156 A | 10/2007 |
| JP | 2008-269999 A | 11/2008 |
| JP | 2008-274364 A | 11/2008 |

OTHER PUBLICATIONS

Machine translation of JP 2000-021546. Jan. 2000.*
Machine translation of JP 2006-196323. Jul. 2006.*
International Search Report, dated Apr. 21, 2009, issued in PCT/JP2009/055359.
Japanese Decision to Grant for corresponding Application No. 2008-072548 dated Aug. 28, 2012 (with English translation).
Extended European Search Report dated Jun. 15, 2011 for Application No. 09721349.0.
Chinese Office Action dated Jul. 4, 2012, for Application No. 200980109362.1 with the English translation.

* cited by examiner

TERMINAL FOR CONNECTOR AND METHOD OF PRODUCING THE SAME

This application is a Continuation application of PCT/JP2009/055359 filed on Mar. 18, 2009, which claims priority under 35 U.S.C. 119(a) to Patent Application No. 2008-072547 filed in Japan on Mar. 19, 2008 and to Patent Application No. 2008-072548 filed in Japan on Mar. 19, 2008, all of which are hereby expressly incorporated by reference into the present application.

TECHNICAL FIELD

The present invention relates to a terminal for a connector and a method of producing the same, and specifically relates to a terminal for a connector, which terminal is favorable in both the property of low plugging-in force and the connection reliability, and a method of producing the same.

BACKGROUND ART

A plated material produced by providing a plating layer of, for example, tin (Sn) or a tin alloy, on an electroconductive base material, such as copper (Cu) or a copper alloy (hereinafter, appropriately referred to as base material), is known as a high performance conductor material having the excellent electroconductivity and mechanical strength of the base material, as well as the excellent electrical connectivity, corrosion resistance, and solderability of the plating layer. Thus, such plated materials are widely used in various terminals, connectors, and the like.

In recent years, since a fitting-type connector is multipolarized with advancement of electronic control, a considerable force is necessary for plugging a group of male terminals into/out of a group of female terminals. In particular, plugging-in/out such a connector is difficult in a narrow space such as the engine room of a vehicle, and it has been strongly demanded to reduce the force for plugging in/out such a connector.

In order to reduce the plugging-in/out force, the Sn plating layer on the surface of the connector terminal may be thinned to weaken contact pressure between the terminals. However, because the Sn plating layer is soft, a fretting phenomenon may occur between contact faces of the terminals, thereby causing inferior conduction between the terminals.

In the fretting phenomenon, the soft Sn plating layer on the surface of the terminal wears and is oxidized, becoming abrasion powder having large specific resistance, due to fine vibration between the contact faces of the terminals caused by vibration and changes in temperature. When this phenomenon occurs between the terminals, conduction between the terminals results in inferior. The lower the contact pressure between the terminals, the more the fretting phenomenon is apt to occur.

Patent Literature 1 describes a method of producing a fitting-type connection terminal, in which an underlying copper plating layer is formed on a base material of copper or a copper alloy, a tin plating layer is further formed on the surface thereof, then the face opposite to the sliding face in the fitting unit of the terminal is irradiated with a laser beam, so that the part corresponding to the beam spot of the laser in the sliding face is heated by heat transfer, and thereby a copper-tin alloy layer is formed at the interface between the tin plating layer and the underlying copper plating layer.

According to Patent Literature 1, it is believed that, under laser beam irradiation conditions that are capable of maintaining a thin tin plating layer, it is possible to decrease the plugging-in force of the terminal while maintaining the contact resistance stable; further, since the tin plating layer is not directly irradiated with the laser beam, the tin plating layer does not undergo a change by fusion, and the contact resistance is not deteriorated.

Patent Literature 2 describes a fitting-type male terminal having a tin plated layer provided on the surface of a tab of the fitting-type male terminal where plugging marks are formed on the surface of the tabular tab of the fitting-type male terminal when brought into elastic contact with protruding parts formed so as to sandwich the tab within the fitting unit of a fitting-type female terminal, wherein the vicinity of the connection mark at the end of the plugging mark is surface-treated to have a plating thickness that is at least larger than that of the area where the plugging mark is formed.

In this fitting-type male terminal, the contact site where the connection mark is formed has a plating layer that is capable of securing connection reliability, and the plating layer of the area where the plugging mark is formed in the front part of the contact site, is thin. Thus, it is believed to make it possible to achieve both the effect of reducing a plugging-in force and the connection reliability.

Patent Literature 1: JP-A-11-233228 ("JP-A" means unexamined published Japanese patent application)
Patent Literature 2: JP-A-2005-353352

DISCLOSURE OF INVENTION

Technical Problem

However, in the foregoing fitting-type connection terminal, the solder wettability is decreased by heating through the back surface which is used in soldering, and the friction coefficient is high at the area where sliding occurs at the time of plugging-in. Therefore, it is still unsatisfactory in achieving both of the property of low plugging-in force and the connection reliability.

It is an object of the present invention to provide a terminal for a connector, which terminal is favorable in both of the property of low plugging-in force and the connection reliability, and to provide a method of producing the same.

Solution to Problem

According to the present invention, there is provided the following means:

(1) A terminal for a connector, fabricated from a metallic material for a connector which material has a tin layer or a tin alloy layer formed on a base material of copper or a copper alloy, wherein the thickness of the tin layer or the tin alloy layer at a contact site on the surface of the terminal is smaller than the thickness of the tin layer or the tin alloy layer in the areas other than the contact site, and a copper-tin alloy layer is formed as an under layer of the tin layer or the tin alloy layer at the contact site;

(2) A terminal for a connector, fabricated from a metallic material for a connector which material has a base material of copper or a copper alloy, wherein a copper-tin alloy layer is formed in a spot shape at a contact site on the surface of the terminal, and a tin layer or a tin alloy layer is formed in the remaining areas on the surface of the metallic material;

(3) The terminal for a connector as described in the item (1) or (2), wherein a copper layer or a copper alloy layer is formed as an under layer of the tin layer or the tin alloy layer;

(4) The terminal for a connector as described in any one of the items (1) to (3), wherein a nickel layer or a nickel alloy layer is formed on the base material;

(5) A method for producing a terminal for a connector, comprising: providing a base material of copper or a copper alloy and forming a tin plating layer or a tin alloy plating layer on this base material, to obtain a metallic material for a connector; subsequently carrying out a reflow treatment in a spot shape at a particular site of the metallic material; and then fabricating the metallic material into the shape of a terminal for a connector;

(6) A method for producing a terminal for a connector, comprising: providing a base material of copper or a copper alloy and forming a tin plating layer or a tin alloy plating layer on this base material, to obtain a metallic material for a connector; fabricating this metallic material into the shape of a terminal for a connector; and then carrying out a reflow treatment in a spot shape at a particular site including a contact site on the surface of the terminal;

(7) The method of producing a terminal for a connector as described in the item (5), wherein the reflow treatment is carried out, to form a copper-tin alloy layer, thereby to reduce the thickness of the tin plating layer or the tin alloy plating layer;

(8) The method for producing a terminal for a connector as described in the above item (6), wherein the reflow treatment is carried out, to form a copper-tin alloy layer at the contact site, thereby to reduce the thickness of the tin plating layer or the tin alloy plating layer;

(9) The method of producing a terminal for a connector as described in the item (7) or (8), wherein the thickness of the tin plating layer or the tin alloy plating layer before subjecting to the reflow treatment is 0.8 to 1.3 µm;

(10) The method for producing a terminal for a connector as described in the above item (7) or (8), wherein a nickel plating layer or a nickel alloy plating layer, and a copper plating layer or a copper alloy plating layer are provided between the base material and the tin plating layer or the tin alloy plating layer, in sequence from the side closer to the base material, to thereby obtain the metallic material for a connector;

(11) The method of producing a terminal for a connector as described in the item (10), wherein the thickness of the tin plating layer or the tin alloy plating layer before subjecting to the reflow treatment is 0.8 to 1.3 µm, and wherein the ratio (Sn thickness/Cu thickness) of the thickness of the tin plating or tin alloy plating layer (Sn thickness) to the thickness of the copper plating layer (Cu thickness) is 2 or greater;

(12) The method for producing a terminal for a connector described in the above item (5), wherein the reflow treatment is carried out, to make the copper-tin alloy to be exposed at a part of the surface of the metallic material;

(13) The method for producing a terminal for a connector described in the above item (6), wherein the reflow treatment is carried out, to make the copper-tin alloy to be exposed at the contact site;

(14) The method of producing a terminal for a connector as described in the item (12) or (13), wherein the thickness of the tin plating layer or the tin alloy plating layer before subjecting to the reflow treatment is 0.3 to 0.8 µm;

(15) The method for producing a terminal for a connector as described in the above item (12) or (13), wherein a nickel plating layer or a nickel alloy plating layer, and a copper plating layer or a copper alloy plating layer are provided between the base material and the tin plating layer or the tin alloy plating layer, in sequence from the side closer to the base material, to thereby obtain the metallic material for a connector;

(16) The method of producing a terminal for a connector as described in the item (12) or (13), wherein the thickness of the tin plating layer or the tin alloy plating layer before subjecting to the reflow treatment is 0.3 to 0.8 µm, and wherein the ratio (Sn thickness/Cu thickness) of the thickness of the tin plating or tin alloy plating layer (Sn thickness) to the thickness of the copper plating layer (Cu thickness) is less than 2; and

(17) The method of producing a terminal for a connector as described in any one of the items (5) to (16), wherein the reflow treatment is carried out by laser beam irradiation.

Hereinafter, a first embodiment of the present invention means to include the terminal for a connector, as described in the items (1), and (3) to (4) {limited to those directly or indirectly dependent on the item (1)}, and the method of producing a terminal for a connector, as described in the items (5), (6), (7) to (11), and (17) {among these, limited to those directly or indirectly dependent on the items (5), (6) and (7)}.

Further, a second embodiment of the present invention means to include the terminal for a connector described in the items (2), and (3) to (4) {limited to those directly or indirectly dependent on the item (2)}, and the method of producing a terminal for a connector described in the items (5), (6), (12) to (16), and (17) {among these, limited to those directly or indirectly dependent on the items (5), (6) and (12)}.

Herein, the present invention means to include all of the above first and second embodiments, unless otherwise specified.

Advantageous Effects of Invention

The terminal for a connector of the present invention is such that the contact site has a low coefficient of friction and is excellent in fretting resistance, and the remaining part other than the above is excellent in solderability and environment resistance. Thus, the terminal for a connector of the present invention is favorable in both of the low plugging-in force and the connection reliability.

Other and further features and advantages of the invention will appear more fully from the following description, appropriately referring to the accompanying drawings.

BRIEF DESCRIPTION OF THE DRAWINGS

FIG. 1(a) is an enlarged cross-sectional view showing a metallic material for a connector, FIG. 1(b) is an enlarged cross-sectional view showing a metallic material for a connector after a preliminarily reflow; and FIG. 1(c) is an enlarged cross-sectional view of a terminal reflowed in a spot shape.

FIG. 2(a) is an enlarged cross-sectional view showing a metallic material for a connector, FIG. 2(b) is an enlarged cross-sectional view showing a metallic material for a connector after a preliminarily reflow; and FIG. 2(c) is an enlarged cross-sectional view of a terminal reflowed in a spot shape.

DESCRIPTION OF REFERENCE NUMERALS

Figure 1:
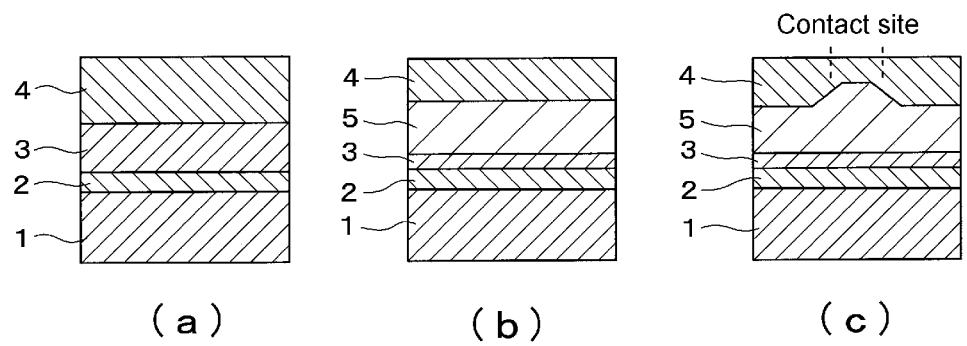
FIG. 1 is an explanatory diagram schematically showing an example of a method for producing a terminal for a connector of a preferred embodiment of the present invention.

1 Base material
2 Ni layer
3 Cu layer

4 Sn layer
5 Cu/Sn alloy layer
11 Male terminal
12 Female terminal
13 Tab
14 Tongue
15 Bead

BEST MODE FOR CARRYING OUT THE INVENTION

As the base material for the metallic material for a connector of the present invention, copper or a copper alloy is used; and use may be preferably made of copper and copper alloys, such as phosphor bronze, brass, nickel silver, beryllium copper, and Corson alloy, each of which has the electroconductivity, mechanical strength, and heat resistance, required in connectors.

The base material has an arbitrary shape such as a bar, a round wire, or a rectangular wire.

In the present invention, it is preferable to carry out Cu underlying plating on the base material, and to provide a Cu plating layer, but a constitution, such as one capable of forming a copper-tin alloy by reflow that will be described later, may be used without any underlying. When a Cu plating layer is provided, the formation of a Cu—Sn alloy layer with a reduced Cu concentration can be readily achieved. The thickness of the Cu plating layer is preferably 0.01 to 3.0 μm, and more preferably 0.05 to 1.0 μm.

Further, in order to enhance heat resistance, a nickel plating layer may be formed, by providing a nickel (Ni) underlying plating having a barrier property that prevents the diffusion of metal from the lower layer, between the base material and the copper underlying. The nickel underlying plating may be a Ni alloy plating, such as a Ni—P-based, a Ni—Sn-based, a Co—P-based, a Ni—Co-based, a Ni—Co—P-based, a Ni—Cu-based, a Ni—Cr-based, a Ni—Zn-based, or a Ni—Fe-based. Ni and Ni alloys are not deteriorated in the barrier function even in a high temperature environment.

When the thickness of the nickel plating layer is less than 0.02 μm, the barrier function is not exhibited sufficiently, and when the thickness is greater than 3.0 μm, the plating strain is increased, and the plating layer is apt to be peeled off from the base material. Therefore, the thickness of the nickel plating layer is preferably 0.02 to 3.0 μm. The upper limit of the thickness of the nickel plating layer is preferably 1.5 μm, and more preferably 1.0 μm, taking the terminal processability into consideration.

In the present invention, the surface layer of the metallic material is provided with tin plating or with tin alloy plating, and matt tin plating or tin alloy plating is preferable to glossy plating since the matt plating increases the absorptance of laser beam.

The terminal for a connector according to a preferred embodiment (the "first embodiment") of the present invention is fabricated from a metallic material having a tin layer or a tin alloy layer formed on a base material of copper or a copper alloy, and the thickness of the tin layer or the tin alloy layer at a contact site on the surface of the terminal is smaller than the thickness of the tin layer or the thin alloy layer in the region other than the contact site, and a copper-tin alloy layer is formed as an under layer of the tin layer or the tin alloy layer at the contact site. If the thickness of the tin plating or the tin alloy plating is too small, the heat resistance and environment resistance of tin are hardly exhibited. Therefore, in the present embodiment, the thickness of the tin plating or the tin alloy plating of the metallic material is preferably 0.3 μm or more, more preferably 0.8 to 1.2 μm, and further preferably 0.8 to 1.0 μm.

The terminal for a connector according to another preferable embodiment (the "second embodiment") of the present invention is fabricated from a metallic material for a connector containing a base material of copper or a copper alloy, and the terminal for a connector has a copper-tin alloy layer formed in a spot shape at a contact site on the surface, and has a tin layer or a tin alloy layer formed in the remaining areas on the surface of the metallic material. As mentioned above, if the thickness of the tin plating or the tin alloy plating is too small, the heat resistance and environment resistance of tin are hardly exhibited. Therefore, in the present embodiment, the thickness of the tin plating or the tin alloy plating of the metallic material is preferably 0.3 μm or more, more preferably 0.3 to 0.8 μm, and further preferably 0.3 to 0.6 μm.

In the present invention, the tin plating may be formed by performing electroless plating, but it is preferable to form the tin plating by electroplating. Further, as the Sn alloy plating, plating of a Sn-based alloy, such as Sn—Cu, Sn—Bi, Sn—Ag, Sn—Zn, Sn—In, Sn—Pb, or Sn—Ag—Cu, can be used with preference.

The Sn electroplating of the surface layer may be performed by, for example, using a tin sulfate bath, at a plating temperature of 30° C. or lower, with a current density of 5 A/dm$^2$. The conditions are not limited thereto and can be appropriately set up.

In the production of the terminal for a connector of the first embodiment, when an underlying copper plating is provided, the ratio (Sn thickness/Cu thickness) of the thickness of the surface tin plating or tin alloy plating layer (Sn thickness) to the thickness of the underlying copper plating layer (Cu thickness) is preferably 2 or greater, and more preferably 2.0 to 3.0.

In the production of the terminal for a connector of the second embodiment, when an underlying copper plating is provided, the ratio (Sn thickness/Cu thickness) of the thickness of the surface tin plating or tin alloy plating layer (Sn thickness) to the thickness of the underlying copper plating layer (Cu thickness) is preferably less than 2, and more preferably equal to or greater than 1.0 and less than 2.0.

The terminal for a connector of the present invention is formed from a metallic material for a connector having a tin layer or a tin alloy layer formed on the surface of a base material of copper or a copper alloy, and has a copper-tin alloy formed at a contact site of the terminal for a connector. In order to obtain this terminal, a reflow treatment (a treatment of melting and re-solidifying a plating or a coating of another form) is carried out on the metallic material for a connector, or on a product fabricated from the metallic material for a connector into the shape of a terminal by press working, only at a contact site of the terminal (or the site on the metallic material that will serve as a contact site of a terminal once the material is formed into a terminal), so that the thickness of the tin layer or the tin alloy layer at the contact site is reduced, or the copper-tin alloy layer is exposed at the contact site.

The reflow treatment is not limited as long as the treatment is a method capable of performing reflow in a specific area (defined area), that is, in a spot shape, on the surface of the material, and a treatment, by laser light irradiation, of an area corresponding to the beam spot of laser light can be suitably used. For example, the contact site can be subjected to a limited reflow treatment by heating, using a YAG laser irradiating apparatus or a semiconductor laser irradiating apparatus used in material processing. Here, there are no numerical reference values in connection with the area of the region in a spot shape that is subjected to a reflow treatment; however, it is required that the region in a spot shape encompass at least the site which serves as a contact site of the terminal.

Hereinafter, the reflow treatment carried out using laser beam irradiation will be explained.

In the present invention, the terminal is irradiated with laser light from the surface side, that is, the sliding surface side, of the contact site, so as to grow a copper-tin intermetallic compound (copper-tin alloy) on the sliding surface side. The output power of the laser light is preferably 1 W to 60 W.

The laser light irradiation in the production of the terminal for a connector of the first embodiment is carried out under the conditions for laser light irradiation which allow a thin Sn plating or Sn alloy plating layer to remain on the surface. The thickness of the Sn plating or Sn alloy plating layer on the surface after laser light irradiation at the site with the smallest thickness of the plating layer is preferably 0.1 to 0.3 μm.

Furthermore, the laser light irradiation in the production of the terminal for a connector of the second embodiment is carried out under the conditions for laser light irradiation which do not allow any Sn plating or Sn alloy plating layer to remain on the surface.

The depth of reflow achieved by the laser heating as described above is, if an underlying plating layer has been provided, adjusted to be shallower than the total thickness of plating provided on the material, and to be deeper than the thickness of the tin plating.

Further, in order to prevent the reflow treatment from being achieved in excess, laser beam irradiation may be carried out while the material is cooled from the side opposite to the side irradiated with laser beam.

The laser beam treatment may be carried out in the air, but may also be carried out under a reducing atmosphere.

A preliminary reflow treatment may also be carried out in a manner that areas including the areas other than the contact site, where the reflow treatment is not carried out, are subjected to a preliminary reflow treatment. However, it is required that the exposure of a copper-tin intermetallic compound at the surface due to the preliminary reflow treatment, be prevented. The preliminary reflow treatment can be carried out by means of, for example, a heat apparatus such as an electromagnetic induction heating furnace, a burner heating furnace, or an atmosphere furnace.

FIG. 1 is an explanatory diagram schematically showing, through a magnified cross-sectional view, an example of the method for producing a terminal of the first embodiment of the present invention. FIG. 1(a) shows a plated material (metallic material for a connector) in which a nickel underlying plating and a copper underlying plating are provided in this order on a base material 1 formed from a copper alloy, to form a Ni layer 2 and a Cu layer 3, and a Sn layer 4 is formed by tin plating on the Cu layer 3. Subsequently, this plated material is fabricated into the shape of a terminal by press working or the like according to a conventional method, and then a preliminary reflow treatment is carried out by means of a burner heating furnace. In this manner, as shown in FIG. 1(b), a CuSn alloy layer 5 containing a copper-tin intermetallic compound is formed at the boundary of the Cu layer 3 and the Sn layer 4. Subsequently, only the contact site is subjected to a reflow treatment in a spot shape by irradiating the contact site with laser light from the surface side, and the CuSn alloy layer 5 is allowed to grow on the surface side, to achieve the state as shown in FIG. 1(c). At this time, the Sn layer 4 remains at the surface of the contact site, in the state of having a reduced thickness.

Figure 2:
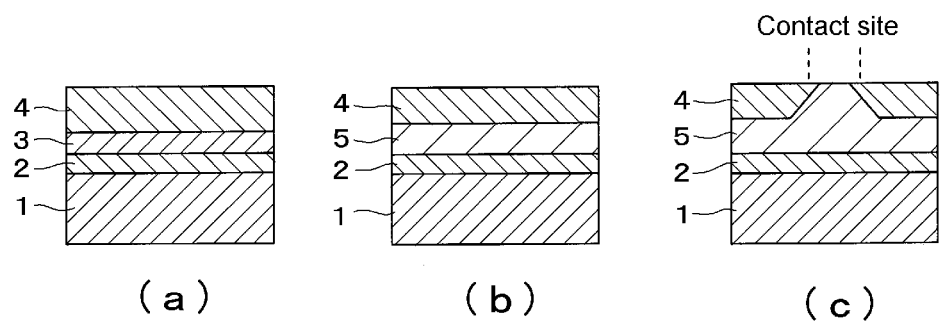
FIG. 2 is an explanatory diagram schematically showing an example of a method for producing a terminal for a connector of another preferred embodiment of the present invention.

FIG. 2 is an explanatory diagram schematically showing, through a magnified cross-sectional view, an example of the method for producing a terminal of the second embodiment of the present invention. FIG. 2(a) shows a plated material (metallic material for a connector) in which a nickel underlying plating and a copper underlying plating are provided in this order on a base material 1 formed from a copper alloy, to form a Ni layer 2 and a Cu layer 3, and a Sn layer 4 is formed by tin plating on the Cu layer 3. Subsequently, this plated material is fabricated into the shape of a terminal by press working or the like according to a conventional method, and then a preliminary reflow treatment is carried out using a burner heating furnace. In this manner, as shown in FIG. 2(b), a CuSn alloy layer 5 containing a copper-tin intermetallic compound is formed from the Cu layer 3 and the Sn layer 4 adjacent thereto. Subsequently, only the contact site is subjected to a reflow treatment in a spot shape by irradiating the contact site with laser light from the surface side, and the CuSn alloy layer 5 is allowed to grow on the surface side. Thus, as shown in FIG. 2(c), the CuSn alloy layer 5 is exposed at the surface.

Figure 3:
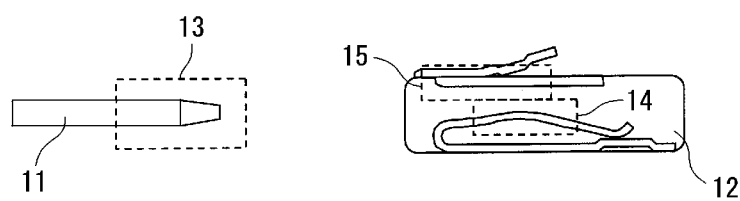
FIG. 3 is a side view of an example of a terminal for a connector according to an embodiment of the present invention.

According to the present invention, the material prior to the reflow treatment can be fabricated into the shape of a terminal by a conventional method such as press working. FIG. 3 is a lateral view of a fitting type terminal, which is an example of the terminal for a connector of the present invention, and the fitting type terminal is constituted of a male terminal 11 and a female terminal 12. The parts surrounded by broken lines are such that reference numeral 13 represents a tab of the male terminal, reference numeral 14 represents a tongue piece of the female terminal, and reference numeral 15 represents a bead of the female terminal. In the upper part of the tongue piece 14, a dimple having a protruding shape is formed. When the male terminal 11 is inserted and fitted into the female terminal 12, the tab 13 is inserted into the gap between the tongue piece 14 and the bead 15. When the tab 13 is completely inserted, the tab 13 is brought into strong contact with the tongue piece 14 and the bead 15, and the tab 13 is maintained in pressed contact between the two members. Thereby, satisfactory electrical connection is achieved between the male terminal 11 and the female terminal 12. The upper surface and the lower surface of the tab 13 serve as the contact sites on the side of the male terminal 11, while the tongue piece 14 (dimple) and the bead 15 serve as the contact sites on the side of the female terminal 12.

The reflow process is carried out after the fabrication into the shape of a terminal, but fabrication may be carried out again after the reflow treatment. Here, when the positions of the contact sites of the terminal that is fabricated by press working from the metallic material for a connector, can be specified, for example, when holes for the determination of position are provided on the metallic material for a connector, the metallic material for a connector may be subjected to the reflow process and then to press working.

The terminal for a connector of the present invention can be suitably used in fitting-type connection terminals for various electrical/electronic equipments including, for example, fitting-type connectors for automobiles. The terminal for a connector of the present invention is such that the contact site has a low coefficient of friction and is excellent in fretting resistance, and the other areas have excellent solderability and environment resistance. Thus, the terminal for a connector attains both of the low plugging-in force and the connection reliability.

EXAMPLES

The present invention will be described in more detail based on examples given below, but the invention is not meant to be limited by these.

In the following Examples and Comparative Examples, copper plating was carried out using a sulfuric acid bath, nickel plating was carried out using a sulfamic acid bath, and tin plating was carried out using a sulfuric acid bath.

Example 1

A 7/3 brass rectangular wire with width 0.64 mm (manufactured by Furukawa Electric Co., Ltd., material according to JIS Standard C2600: hereinafter, the same) was provided with an underlying plating of copper with thickness 0.3 µm, and then tin plating was conducted with thickness 0.8 µm. The material was fabricated into the shape of a male terminal of a connection terminal by press working, and then a reflow treatment was carried out by irradiating the contact site with YAG laser (output power 30 W, wavelength 1064 nm). The surface of the contact site was covered with a thin layer of pure tin.

Example 2

A rectangular wire of Corson alloy (trade name: EFTEC-97, manufactured by Furukawa Electric Co., Ltd.: hereinafter, the same) with width 0.64 mm was provided with an underlying plating of copper with thickness 0.5 µm, and then tin plating was conducted with thickness 1.2 µm. The material was fabricated into the shape of a male terminal of a connection terminal by press working, and then a reflow treatment was carried out by irradiating the contact site with YAG laser (output power 30 W, wavelength 1064 nm). The surface of the contact site was covered with a thin layer of pure tin.

Example 3

A 7/3 brass rectangular wire with width 0.64 mm was provided with an underlying plating of nickel with thickness 0.5 µm and an underlying plating of copper with thickness 0.3 µm, and then tin plating was conducted with thickness 0.8 µm. The material was fabricated into the shape of a male terminal of a connection terminal by press working, and then a reflow treatment was carried out by irradiating the contact site with YAG laser (output power 30 W, wavelength 1064 nm). The surface of the contact site was covered with a thin layer of pure tin.

Example 4

A rectangular wire of Corson alloy with width 0.64 mm was provided with an underlying plating of nickel with thickness 0.5 µm and an underlying plating of copper with thickness 0.5 µm, and then tin plating was conducted with thickness 1.2 µm. The material was fabricated into the shape of a male terminal of a connection terminal by press working, and then a reflow treatment was carried out by irradiating the contact site with YAG laser (output power 30 W, wavelength 1064 nm). The surface of the contact site was covered with a thin layer of pure tin.

Example 5

A 7/3 brass rectangular wire with width 0.64 mm was provided with an underlying plating of nickel with thickness 0.3 µm and an underlying plating of copper with thickness 0.3 µm, and then tin plating was conducted with thickness 0.8 µm. The material was fabricated into the shape of a male terminal, and then a reflow treatment was carried out by heating the portion to be used as a contact site with semiconductor laser irradiation (output power 5 W, wavelength 915 nm). The surface of the contact site was covered with a thin layer of pure tin.

Example 6

A rectangular wire of Corson alloy with width 0.64 mm was provided with an underlying plating of nickel with thickness 0.3 µm and an underlying plating of copper with thickness 0.5 µm, and then tin plating was conducted with thickness 1.2 µm. The material was fabricated into the shape of a male terminal, and then a reflow treatment was carried out by heating the portion to be used as a contact site with YAG laser irradiation (output power 5 W, wavelength 915 nm). The surface of the contact site was covered with a thin layer of pure tin.

Comparative Example 1

A 7/3 brass rectangular wire with width 0.64 mm was provided with an underlying plating of nickel with thickness 0.5 µm and an underlying plating of copper with thickness 0.5 µm, and then tin plating was conducted with thickness 1.2 µm. The material was fabricated into the shape of a male terminal of a connection terminal by press working.

Comparative Example 2

A 7/3 brass rectangular wire with width 0.64 mm was provided with an underlying plating of nickel with thickness 0.5 µm and an underlying plating of copper with thickness 0.5 µm, and then tin plating was conducted with thickness 1.2 µm. The material was subjected to a reflow treatment by heating the entire surface with a burner to a temperature at or above the melting point of Sn, and then the material was fabricated into the shape of a male terminal of a connection terminal by press working.

Comparative Example 3

A 7/3 brass rectangular wire with width 0.64 mm was provided with an underlying plating of nickel with thickness 0.5 µm and an underlying plating of copper with thickness 0.5 µm, and then tin plating was conducted with thickness 1.2 µm. The material was fabricated into the shape of a male terminal of a connection terminal by press working, and then a reflow treatment was carried out by heating the entire surface with a burner to a temperature at or above the melting point of Sn.

Example 7

A 7/3 brass rectangular wire with width 0.64 mm was provided with an underlying plating of copper with thickness 0.3 µm, and then tin plating was conducted with thickness 0.3 µm. The material was fabricated into the shape of a male terminal of a connection terminal by press working, and then a reflow treatment was carried out by irradiating the contact site with YAG laser (output power 30 W, wavelength 1064 nm). A copper-tin intermetallic compound was exposed at the surface of the contact site.

Example 8

A rectangular wire of Corson alloy with width 0.64 mm was provided an underlying plating of copper with thickness 0.5 µm, and then tin plating was conducted with thickness 0.6 µm. The material was fabricated into the shape of a male terminal of a connection terminal by press working, and then a reflow treatment was carried out by irradiating the contact site with YAG laser (output power 30 W, wavelength 1064 nm). A copper-tin intermetallic compound was exposed at the surface of the contact site.

Example 9

A 7/3 brass rectangular wire with width 0.64 mm was provided with an underlying plating of nickel with thickness 0.5 µm and an underlying plating of copper with thickness 0.3 µm, and then tin plating was conducted with thickness 0.3 µm. The material was fabricated into the shape of a male terminal of a connection terminal by press working, and then a reflow treatment was carried out by irradiating the contact site with YAG laser (output power 30 W, wavelength 1064 nm). A copper-tin intermetallic compound was exposed at the surface of the contact site.

Example 10

A rectangular wire of Corson alloy with width 0.64 mm was provided with an underlying plating of nickel with thickness 0.5 µm and an underlying plating of copper with thickness 0.5 µm, and then tin plating was conducted with thickness 0.6 µm. The material was fabricated into the shape of a male terminal of a connection terminal by press working, and then a reflow treatment was carried out by irradiating the contact site with YAG laser (output power 30 W, wavelength 1064 nm). A copper-tin intermetallic compound was exposed at the surface of the contact site.

Example 11

A 7/3 brass rectangular wire with width 0.64 mm was provided with an underlying plating of nickel with thickness 0.3 µm and an underlying plating of copper with thickness 0.3 µm, and then tin plating was conducted with thickness 0.3 µm. The material was fabricated into the shape of a male terminal, and then a reflow treatment was carried out by heating the portion to be used as a contact site with YAG laser irradiation (output power 5 W, wavelength 915 nm). A copper-tin intermetallic compound was exposed at the surface of the contact site.

Example 12

A rectangular wire of Corson alloy with width 0.64 mm was provided with an underlying plating of nickel with thickness 0.3 µm and an underlying plating of copper with thickness 0.5 µm, and then tin plating was conducted with thickness 0.6 µm. The material was fabricated into the shape of a male terminal, and then a reflow treatment was carried out by heating the portion to be used as a contact site with semiconductor laser irradiation (output power 5 W, wavelength 915 nm). A copper-tin intermetallic compound was exposed at the surface of the contact site.

Comparative Example 4

A 7/3 brass rectangular wire with width 0.64 mm was provided with an underlying plating of nickel with thickness 0.5 µm and an underlying plating of copper with thickness 0.5 µm, and then tin plating was conducted with thickness 0.6 µm. The material was fabricated into the shape of a male terminal of a connection terminal by press working.

Comparative Example 5

A 7/3 brass rectangular wire with width 0.64 mm was provided with an underlying plating of nickel with thickness 0.5 µm and an underlying plating of copper with thickness 0.5 µm, and then tin plating was conducted with thickness 0.6 µm. The material was subjected to a reflow treatment by heating the entire surface with a burner to a temperature at or above the melting point of Sn, and then the material was fabricated into the shape of a male terminal of a connection terminal by press working.

Comparative Example 6

A 7/3 brass rectangular wire with width 0.64 mm was provided with an underlying plating of nickel with thickness 0.5 µm and an underlying plating of copper with thickness 0.5 µm, and then tin plating was conducted with thickness 0.6 µm. The material was fabricated into the shape of a male terminal of a connection terminal by press working, and then a reflow treatment was carried out by heating the entire surface with a burner to a temperature at or above the melting point of Sn.

Test Example

The connection terminals of Examples 1 to 12 and Comparative examples 1 to 6 were subjected to evaluation tests on contact resistance, solder wettability, and coefficient of kinetic friction.

(Contact Resistance)

The contact resistance was measured according to a four-terminal method. An Ag probe was used for a contact, and the measurement was made under a load of 1 N. A contact resistance of 5 mΩ or less was designated to as acceptable (passed the test) ○, and a higher contact resistance was designated to as unacceptable ×.

(Solder Wettability)

The solder wettability was measured according to a meniscograph method.

Solder Checker SAT-5100, manufactured by Rhesca Corp., was used for the apparatus.

Lead-free solder of Sn-3.0Ag-0.5Cu was used as the solder, and a 25% rosin flux was used.

The determination criteria were as follows: good ○○ when 95% or more of the immersed area was wet, acceptable ○ when 90% or more and less than 95% of the immersed area was wet, and unacceptable × when the wet area was less than that.

(Coefficient of Kinetic Friction)

A Bowden tester was used for the measurement of the coefficient of kinetic friction.

The measurement was made with a sliding contact provided with dimples as a model of a group of female terminals.

The determination criteria were as follows: good ○○ when $\mu k < 0.25$, acceptable ○ when $0.25 \leq \mu k < 0.3$, and unacceptable × when $\mu k$ was 0.3 or more.

TABLE 1

|  | Contact resistance | Solder wettability | Coefficient of kinetic friction |
| --- | --- | --- | --- |
| Example 1 | ○ | ○○ | ○○ |
| Example 2 | ○ | ○○ | ○ |
| Example 3 | ○ | ○○ | ○○ |
| Example 4 | ○ | ○○ | ○ |
| Example 5 | ○ | ○○ | ○○ |
| Example 6 | ○ | ○○ | ○ |

TABLE 1-continued

|  | Contact resistance | Solder wettability | Coefficient of kinetic friction |
|---|---|---|---|
| Comparative example 1 | ○ | ○○ | x |
| Comparative example 2 | ○ | ○ | ○ |
| Comparative example 3 | ○ | ○ | x |

TABLE 2

|  | Contact resistance | Solder wettability | Coefficient of kinetic friction |
|---|---|---|---|
| Example 7 | ○ | ○ | ○○ |
| Example 8 | ○ | ○ | ○○ |
| Example 9 | ○ | ○ | ○○ |
| Example 10 | ○ | ○○ | ○○ |
| Example 11 | ○ | ○ | ○○ |
| Example 12 | ○ | ○○ | ○○ |
| Comparative example 4 | ○ | ○○ | x |
| Comparative example 5 | ○ | ○ | ○ |
| Comparative example 6 | ○ | ○ | x |

As shown in Table 1, Examples 1 to 6 all satisfied the acceptance criteria for the items of the contact resistance and the coefficient of kinetic friction, and their solder wettability was rated good "○○, meaning 95% or more of the immersed area was wetted. In contrast, Comparative Examples 1 and 3 were unacceptable for the items of the coefficient of kinetic friction, and Comparative Examples 2 and 3 exhibited a solder wettability of wetting equal to or greater than 90% and less than 95% of the immersed area.

Furthermore, as shown in Table 2, Examples 7 to 12 all satisfied the acceptance criteria for the items of the contact resistance and solder wettabiliity, and their coefficient of kinetic friction were rated good ○○, with μk<0.25. In contrast, Comparative Examples 4 and 6 were unacceptable in the item of the coefficient of kinetic friction, and Comparative Example 5 had a coefficient of kinetic friction of 0.25≤μk<0.3.

Having described our invention as related to the present embodiments, it is our intention that the invention not be limited by any of the details of the description, unless otherwise specified, but rather be construed broadly within its spirit and scope as set out in the accompanying claims.

This non-provisional application claims priority under 35 U.S.C. §119(a) on Patent Application No. 2008-072547 filed in Japan on Mar. 19, 2008, and Patent Application No. 2008-072548 filed in Japan on Mar. 19, 2008, each of which is entirely herein incorporated by reference.

The invention claimed is:

1. A terminal for a connector, fabricated from a metallic material for a connector which material has a base material of copper or a copper alloy, wherein a copper-tin alloy layer is formed in a spot shape at a contact site on the surface of the terminal, and a tin layer or a tin alloy layer is formed in the remaining areas on the surface of the metallic material;
  wherein a nickel layer or a nickel alloy layer is formed on the base material; and
  wherein the copper-tin alloy layer is exposed at the surface of the terminal.

2. The terminal for a connector according to claim 1, wherein a copper layer or a copper alloy layer is formed as an under layer of the tin layer or the tin alloy layer.

3. A method for producing the terminal for a connector according to claim 1, comprising:
  providing a base material of copper or a copper alloy and forming a tin plating layer or a tin alloy plating layer on this base material, to obtain a metallic material for a connector;
  subsequently carrying out a reflow treatment in a spot shape at a particular site of the metallic material; and
  then fabricating the metallic material into the shape of a terminal for a connector;
  wherein the reflow treatment is carried out on the surface of the metallic material which becomes a sliding surface in the connector, to make the copper-tin alloy to be exposed at a part of the surface of the metallic material.

4. The method according to claim 3, wherein the thickness of the tin plating layer or the tin alloy plating layer before subjecting to the reflow treatment is 0.3 to 0.8 μm.

5. The method according to claim 3, wherein a nickel plating layer or a nickel alloy plating layer, and a copper plating layer or a copper alloy plating layer are provided between the base material and the tin plating layer or the tin alloy plating layer, in sequence from the side closer to the base material, to thereby obtain the metallic material for a connector.

6. The method according to claim 5, wherein the thickness of the tin plating layer or the tin alloy plating layer before subjecting to the reflow treatment is 0.3 to 0.8 μam, and wherein the ratio (Sn thickness/Cu thickness) of the thickness of the tin plating or tin alloy plating layer (Sn thickness) to the thickness of the copper plating layer (Cu thickness) is less than 2.

7. The method according to claim 3, wherein the reflow treatment is carried out by laser beam irradiation.

8. A method for producing the terminal for a connector according to claim 1, comprising:
  providing a base material of copper or a copper alloy and forming a tin plating layer or a tin alloy plating layer on this base material, to obtain a metallic material for a connector;
  fabricating this metallic material into the shape of a terminal for a connector; and
  then carrying out a reflow treatment in a spot shape at a particular site including a contact site on the surface of the terminal;
  wherein the reflow treatment is carried out on the surface of the metallic material which becomes a sliding surface in the connector, to make the copper-tin alloy to be exposed at the contact site.

9. The method according to claim 8, wherein the thickness of the tin plating layer or the tin alloy plating layer before subjecting to the reflow treatment is 0.3 to 0.8 μm.

10. The method according to claim 8, wherein a nickel plating layer or a nickel alloy plating layer, and a copper plating layer or a copper alloy plating layer are provided between the base material and the tin plating layer or the tin alloy plating layer, in sequence from the side closer to the base material, to thereby obtain the metallic material for a connector.

11. The method according to claim 10, wherein the thickness of the tin plating layer or the tin alloy plating layer before subjecting to the reflow treatment is 0.3 to 0.8 μm, and wherein the ratio (Sn thickness/Cu thickness) of the thickness of the tin plating or tin alloy plating layer (Sn thickness) to the thickness of the copper plating layer (Cu thickness) is less than 2.

12. The method according to claim 8, wherein the reflow treatment is carried out by laser beam irradiation.

* * * * *